United States Patent
Chen

(10) Patent No.: US 12,450,599 B1
(45) Date of Patent: Oct. 21, 2025

(54) PAYMENT MANAGEMENT SYSTEM USING ASYMMETRIC CRYPTOGRAPHY TO ENSURE INFORMATION ACCURACY

(71) Applicant: OwlTing USA, Inc., Arlington, VA (US)

(72) Inventor: Chun-Jen Chen, New Taipei (TW)

(73) Assignee: OwlTing USA, Inc., Arlington, VA (US)

(*) Notice: Subject to any disclaimer, the term of this patent is extended or adjusted under 35 U.S.C. 154(b) by 0 days.

(21) Appl. No.: 19/220,025

(22) Filed: May 27, 2025

(30) Foreign Application Priority Data

May 16, 2025 (TW) .................................. 114118414

(51) Int. Cl.
- *G06Q 20/38* (2012.01)
- *H04L 9/32* (2006.01)
- *H04L 9/06* (2006.01)
- *H04L 9/08* (2006.01)

(52) U.S. Cl.
CPC ....... *G06Q 20/3825* (2013.01); *H04L 9/3242* (2013.01); *H04L 9/0643* (2013.01); *H04L 9/0822* (2013.01); *H04L 9/0825* (2013.01); *H04L 9/0877* (2013.01); *H04L 9/0894* (2013.01)

(58) Field of Classification Search
None
See application file for complete search history.

(56) References Cited

U.S. PATENT DOCUMENTS

| | | | | |
|---|---|---|---|---|
| 7,698,230 B1* | 4/2010 | Brown | ........... | G06Q 30/018 705/75 |
| 10,841,295 B1* | 11/2020 | Pecen | ........... | H04L 9/3268 |
| 11,451,406 B2* | 9/2022 | Chen | ........... | H04L 9/3066 |
| 11,728,992 B2* | 8/2023 | Gray | ........... | H04L 9/0637 713/168 |
| 2008/0229099 A1* | 9/2008 | Kim | ........... | G06F 21/64 713/168 |

(Continued)

FOREIGN PATENT DOCUMENTS

| | | | | |
|---|---|---|---|---|
| CN | 113793149 | | 12/2021 | |
| CN | 116671064 A | * | 8/2023 | ............... H04L 9/50 |

(Continued)

OTHER PUBLICATIONS

Vikas Srivastava, Anubhab Baksi, and Sumit Kumar Debnath; (An Overview of Hash Based Signatures); pp. 34; Published in (Year: 2023).*

(Continued)

*Primary Examiner* — Ali H. Cheema
(74) *Attorney, Agent, or Firm* — Winston Hsu

(57) ABSTRACT

A payment management system includes a first client and an approval client. The first client provides a trade policy, generates a first hash by applying a first hash function to the trade policy, creates a first signature by asymmetrically encrypting the first hash with a first private key of a first public-private key pair, and broadcasts a first public key of the first public-private key pair. The approval client determines whether the trade policy has not been tampered with by verifying the first signature using the first public key, and determines whether at least one order comply with the trade policy after confirming that the trade policy has not been tampered with.

20 Claims, 8 Drawing Sheets

(56) References Cited

U.S. PATENT DOCUMENTS

| | | | |
|---|---|---|---|
| 2016/0078239 A1* | 3/2016 | Beiter | G06F 21/6209 |
| | | | 713/164 |
| 2016/0352524 A1* | 12/2016 | Kinney | H04L 63/0876 |
| 2016/0379015 A1* | 12/2016 | Samsonov | G06F 21/64 |
| | | | 713/193 |
| 2017/0310654 A1* | 10/2017 | Karlisch | H04W 12/068 |
| 2019/0295050 A1* | 9/2019 | Chalkias | G06Q 20/3829 |
| 2020/0220719 A1* | 7/2020 | Chaudhari | H04L 9/0822 |
| 2021/0203511 A1* | 7/2021 | Qi | G06F 16/9024 |
| 2021/0385066 A1* | 12/2021 | Hearn | G06F 16/2379 |
| 2022/0231839 A1* | 7/2022 | Nelson | H04L 9/088 |
| 2023/0037932 A1* | 2/2023 | Wen | H04L 9/3247 |
| 2023/0091686 A1* | 3/2023 | Nakaike | H04L 9/0877 |
| | | | 705/64 |
| 2023/0125507 A1* | 4/2023 | Tartan | G06Q 20/4016 |
| | | | 705/44 |
| 2023/0208622 A1 | 6/2023 | Griffin | |
| 2024/0406000 A1* | 12/2024 | Nguyen | H04W 12/106 |
| 2025/0190966 A1* | 6/2025 | Gutierrez-Sheris | G06Q 20/02 |

FOREIGN PATENT DOCUMENTS

| | | | | |
|---|---|---|---|---|
| CN | 117040765 A | * | 11/2023 | H04L 9/3271 |
| IL | 290370 A | * | 11/2023 | H04L 63/20 |
| JP | 2001076425 A | | 3/2001 | |
| KR | 20190038561 A | * | 4/2019 | H04L 9/3247 |
| KR | 20250054761 A | * | 4/2025 | H04L 61/104 |
| TW | 202036345 | | 10/2020 | |
| TW | 202441919 | | 10/2024 | |

OTHER PUBLICATIONS

Yunsen Wanga, and Alexander Kogan; (Designing confidentiality-preserving Blockchain-based transaction processing systems); pp. 18; Published in (Year: 2018).*

* cited by examiner

PAYMENT MANAGEMENT SYSTEM USING ASYMMETRIC CRYPTOGRAPHY TO ENSURE INFORMATION ACCURACY

CROSS-REFERENCE TO RELATED APPLICATIONS

This application claims priority to foreign Patent Application No. TW 114118414, filed in Taiwan on 16 May 2025, the disclosure of which is hereby incorporated herein by reference in its entirety.

BACKGROUND OF THE INVENTION

1. Field of the Invention

This invention relates to a payment management system, and more particularly, to a payment management system using asymmetric cryptography to ensure information accuracy.

2. Description of the Prior Art

E-commerce platform industries have various regulations for order processes. Taking a shopping platform system as an example, users add products to a shopping cart. The products in the cart are marked as "pending purchase" orders. When users select one or more products from the cart and proceed to checkout, these products are marked as "pending payment" orders in the shopping platform system. As the user completes the checkout process, these products are marked as "paid" orders. When an order involves products from different vendors, the system uses API (application programming interface), webhook, or email technology to notify vendors of product shipment. The status of these product orders changes according to the product shipment status. When the customer receives the goods and the payment conditions are met, the shopping platform system uses API again to notify the credit card acquiring bank or remittance bank to execute payment, completing the entire shopping process.

If the aforementioned order involves abnormal processing procedures such as returns and refunds, the order marking becomes more complicated. Coupled with various time limits, such as payment deadlines or shipping deadlines, the order status marking will also change. This involves database management access and other technologies. If data access is incorrect, display errors occur, or status filtering is incorrect, it will cause significant public relations crises or even losses for the e-commerce platform.

When the above order status involves financial flows, such as credit card payments, remittances, installment payments, and Buy Now Pay Later (BNPL), coupled with different bank or third-party financial service payment methods, it not only increases complexity but also requires higher security. Traditional e-commerce platforms manage all data centrally on a centralized server. Security risks are mostly focused on defending against external intrusions or Distributed Denial-of-Service (DDOS) attacks that paralyze system services. General cloud service companies such as AWS, Google Cloud, and Azure already provide additional security defense services.

However, as the scale of e-commerce platform systems expands, when orders need to go through user review or status changes on different servers, Man-in-the-middle attacks, such as disguising, intercepting, replacing or information, become easier to occur. Even with API information transfer or tunnel protocols, it is difficult to prevent such attacks at the information flow level in traditional e-commerce platform systems.

SUMMARY OF THE INVENTION

Therefore, the present invention is to provide a payment management system using asymmetric cryptography to ensure information accuracy.

The present invention discloses a payment management system comprising a hardware security module (HSM), a first client, a second client, an approval client, and a transaction router. The HSM is configured to provide a first session key and a second session key. The first client is configured to: provide a trade policy; hash the trade policy with a first hash function to generate a first hash; asymmetrically encrypt, by a first private key of a first public-private key pair, the first hash to generate a first signature; and broadcast a first public key of the first public-private key pair. The second client is configured to: select at least one order from an order pool that has a plurality of orders; symmetrically encrypt information related to the at least one order and the first signature by using the first session key from the HSM to create a first hash-based message authentication code (HMAC); asymmetrically encrypt the first HMAC with a second private key of a second public-private key pair to create a second signature; wrap the information related to the at least one order, the first signature, and the first HMAC by using the second session key from the HSM to create a first order package; deliver the first order package, the first HMAC and the second signature to a designated processing node; and broadcast a second public key of the second public-private key pair, the first session key, and the second session key. The approval last client is configured to: unwrap the first order package to extract the information related to the at least one order, the first signature, and the first HMAC by using the second session key; confirm that the trade policy has not been tampered with by verifying the first signature using the first public key; determine whether the at least one order complies with the trade policy; verify all prior signatures by using their corresponding public keys, respectively; and asymmetrically encrypt a signature received from an immediately preceding client with an approval private key of an approval public-private key pair to generate an approval signature; and broadcast an approval public key of the approval public-private key pair. The transaction router is configured to verify the approval signature by using the approval public key for executing a transaction.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to".

Figure 1:
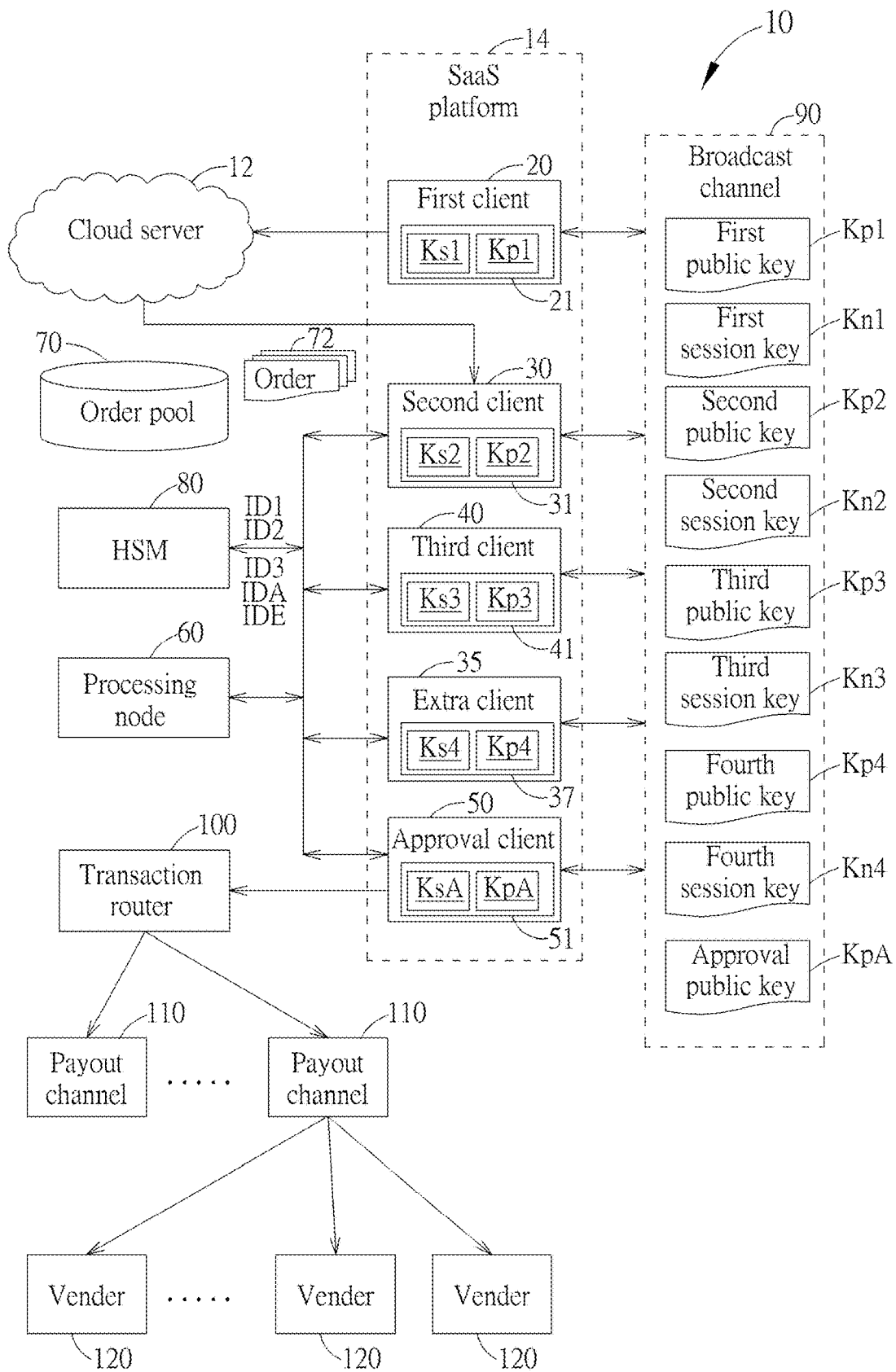
FIG. 1 is a functional block diagram of a payment management system according to an embodiment of the present invention.
Figure 2:
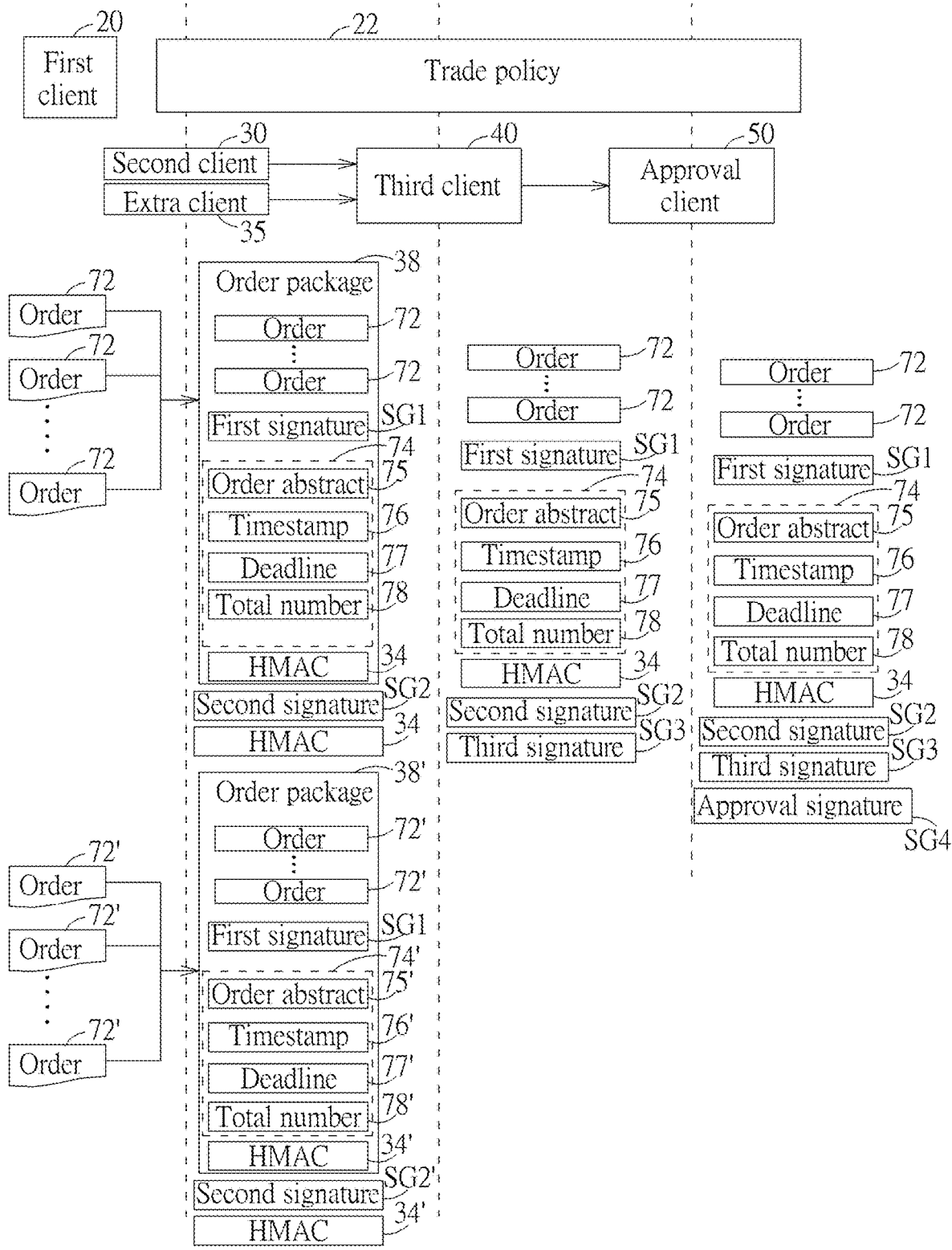
FIG. 2 is a data flow diagram of the payment management system in FIG. 1.

FIG. 1 is a functional block diagram of a payment management system 10 according to an embodiment of the present invention. FIG. 2 is a data flow diagram of the payment management system 10 shown in FIG. 1. The payment management system 10 comprises a first client 20, a second client 30, an extra client 35, a third client 40, and an approval client 50, which may be implemented as different physical electronic devices, such as different computers or servers. Each of the electronic devices has a storage device for storing computer program instructions and one or more processors for executing the computer program instructions to perform all the functions of the first client 20, the second client 30, the extra client 35, the third client 40, or the approval client 50.

Alternatively, the clients 20, 30, 35, 40, and 50 can be realized as software modules or services running on the same server or on different servers within the payment management system 10. In some embodiments, these clients 20, 30, 35, 40, and 50 may operate on a Saas (Software as a Service) platform within the payment management system 10, enhancing their accessibility and scalability. The Saas platform is a cloud-based software delivery model where software applications are hosted by a third-party provider and made available to users over the internet. The Saas platform may utilize many servers, which are typically hosted in the cloud, leveraging the infrastructure of cloud service providers like Microsoft® Azure®, Amazon® Web Services (AWS®), or Google® Cloud Platform. This cloud infrastructure allows SaaS providers to ensure high availability, redundancy, and performance for their applications. The payment management system 10 may further comprise a cloud server 12 connected to the SaaS platform 14. The SaaS platform 14 includes a readable storage medium and one or more processors linked to the readable storage medium. The readable storage medium stores computer program instructions, and the one or more processors execute the computer program instructions to perform all the functions of the first client 20, the second client 30, the extra client 35, the third client 40, and the approval client 50 within the SaaS platform 14.

The payment management system 10 further comprises a hardware security module (HSM) 80 communicated with the SaaS platform 14 by an application programming interface (API) of the SaaS platform 14. The HSM 80 is a physical device used to manage digital keys and perform cryptographic operations with hardware design.

The first client 20, acting as the rule maker of the payment management system 10, is configured to define at least a trade policy 22. The trade policy 22 is a set of rules or standards used to manage and control the transaction process of the payment management system 10, ensuring the security and compliance of transactions. These rules can be designed according to the needs and business models of different companies, covering various stages from the initiation to the completion of transactions.

In the present invention, an order 72 refers to instruction information for executing a financial transaction. Each order 72 includes, but is not limited to, sender, receiver, sum, and payout channel 110. The payout channel 110 is the specified method, gateway, or pathway through which the funds are intended to be delivered (e.g., bank transfer, specific credit card processor, digital wallet service). Optionally, the order 72 might contain additional relevant data such as details of the goods or services being paid for, unique order identifiers, creation timestamps 76, processing deadlines 77, related policy information, or references to prior transactions. The payment management system 10 is designed to receive these orders 72, potentially store them in an order pool 70, aggregate them, secure them using cryptographic methods, wrap them into order packages 38, verify them against the trade policy 22, and route them for executing the payments via the appropriate payout channels 110.

The second client 30 functions as an order aggregator within the payment management system 10. In some embodiments, the second client 30 may be implemented as a software module or service running on a server within the payment management system 10. In other embodiments, the second client 30 may be a physical electronic device (e.g., a computer, a mobile device or a server). The second client 30 consolidates and processes a plurality of orders 72 from various sources, such as online stores, marketplaces, or point-of-sale systems, into a unified order package 38. Each order package 38 may include one or more orders 72. By streamlining the order aggregation process, the second client 30 significantly simplifies the overall payment workflow. This leads to reduced processing time, lower operational costs, and improved efficiency for both the payment management system and its users. Furthermore, in one embodiment, the payment management system 10 may further comprise the order pool 70 for storing the orders 72 from various sources. The order pool 70 provides a centralized repository, enhancing the system's ability to manage and retrieve orders efficiently. By integrating the order pool 70, the second client 30 can ensure that order consolidation is performed seamlessly, further contributing to a more streamlined and effective payment management process. In an embodiment, the order pool 70 may be a database, providing robust and scalable storage solutions for managing order data.

The third client 40 functions as a verifier within the payment management system 10. In some embodiments, the third client 40 may be implemented as a software module or service running on the same server as the second client 30 or on a different server within the payment management system 10. In other embodiments, the third client 40 may be a physical electronic device. The third client 40 is responsible for validating the authenticity and integrity of transactions, ensuring that the transactions adhere to the rules and regulations defined in the trade policy 22, and that they are secure and compliant. The third client 40 plays a pivotal role in maintaining the system's reliability by thoroughly verifying the transactions. By adhering to stringent validation processes, it helps prevent fraudulent activities and ensures the system operates within the established regulatory framework. This meticulous validation process not only safeguards the integrity of the payment management system 10 but also builds trust among its users.

The approval client 50 functions as a financial approver or a last verifier within the payment management system 10. In some embodiments, the approval client may be implemented as a software module or service running on the same server as the second client 30 (or the third client 40) or on a different server within the payment management system 10. In other embodiments, the physical electronic 50 may be a physical electronic device. The approval client 50 is a role responsible for the final authorization and approval of financial transactions. By acting as a final checkpoint, the approval client 50 plays a crucial role in safeguarding the system's financial integrity and preventing unauthorized payments. This role is in maintaining trust and reliability within the payment management system, ensuring that all financial operations are secure and compliant with established policies and regulations.

The trade policy 22 defined by the first client 20 may be adjusted to meet the specific requirements and business models of different companies, covering various stages from the initiation to the completion of transactions. Here are some examples of trade policies:

1. Amount Threshold Policy: Any transaction exceeding a first transaction amount threshold (e.g., $100,000) must be approved by the third client 40 and/or more clients (such as verifier role or authorizer role).
2. Multi-layer Review Policy: All orders exceeding a second transaction amount threshold (e.g., $50,000) require two levels of review. For example, the first level is reviewed by the third client 40, and the second level is additionally reviewed by the approval client 50.
3. Payment Method Restrictions: For transactions exceeding a third transaction amount threshold (e.g., $10,000), only bank transfers are allowed; credit card payments are not permitted.
4. Fast Payment Conditions: If a supplier has a good payment record for a specified period (e.g., the past six months) and the transaction amount is less than a fourth transaction amount threshold (e.g., $5,000), a fast payment procedure can be initiated, bypassing certain review steps (e.g., orders 72 bypass the second client 30 and the third client 40 and are directly processed by the approval client 50).
5. Regional Restrictions: Transactions from certain high-risk regions require additional verification and review steps.
6. Customer Verification Rules: Customers conducting their first transaction must provide complete identification materials and undergo manual verification before proceeding with the transaction.

Within the payment management system 10, the first client 20, the second client 30, the third client 40, and the approval client 50 employ asymmetric cryptography to safeguard the integrity and confidentiality of data. By utilizing public-private key pair cryptography, these clients ensure that transactions are secure and tamper-proof. This robust security mechanism helps to protect sensitive financial information and prevent unauthorized access or modification. The pair of public-private keys of each client is related to the client identity to ensure a signature is signed by a correct client. Specifically, all of the public-private key pairs are issued by the HSM. Each client sends a corresponding client identity (ID) token to the HSM 80 and receives the public-private key pair from the HSM 80. The HSM 80 utilizes the client ID token to calculate its public-private key pair with the algorithm including Rivest-Shamir-Adleman (RSA) algorithm, Digital Signature Algorithm (DSA) or Elliptic Curve Digital Signature Algorithm (ECDSA). The first client 20 sends a ID token ID1 to the HSM 80 and receives a first public-private key pair 21, which comprises a first private key Ks1 and a first public key Kp1, from the HSM 80. The second client 30 sends a ID token ID2 to the HSM 80 and receives a second public-private key pair 31, which comprises a second private key Ks2 and a second public key Kp2, from the HSM 80. The third client 40 sends a ID token ID3 to the HSM 80 and receives a third public-private key pair 41, which comprises a third private key Ks3 and a third public key Kp3, from the HSM 80. The approval client 50 sends a ID token IDA to the HSM 80 and receives an approval public-private key pair 51, which comprises an approval private key KsA and an approval public key KpA. The extra client 35 sends a ID token IDE to the HSM 80 and receives a fourth public-private key pair 37, which comprises a fourth private key Ks4 and a fourth public key Kp4, from the HSM 80. These ID tokens ID1, ID2, ID3, IDA, and IDE are used to identify and authenticate these clients 20, 30, 35, 40, and 50. When a client interacts with the HSM 80, the corresponding ID token serves as proof of identity for that specific client.

The first public key Kp1, second public key Kp2, third public key Kp3, fourth public key Kp4, and approval public key KpA are broadcast from the first client 20, second client 30, third client 40, extra client 35, and approval client 50, respectively, through a broadcast channel 90 of the payment management system 10. Consequently, after the first client 20, second client 30, third client 40, extra client 35, and approval client 50 create signatures using their respective private keys (Ks1, Ks2, Ks3, Ks4, and KsA), other clients can verify these signatures by using the corresponding public keys (Kp1, Kp2, Kp3, Kp4, and KpA). This method ensures that only authorized clients can authenticate transactions, maintaining the integrity and security of the payment management system 10. It significantly reduces the risk of data breaches and unauthorized modifications, thereby enhancing trust and reliability in the system.

Figure 3:
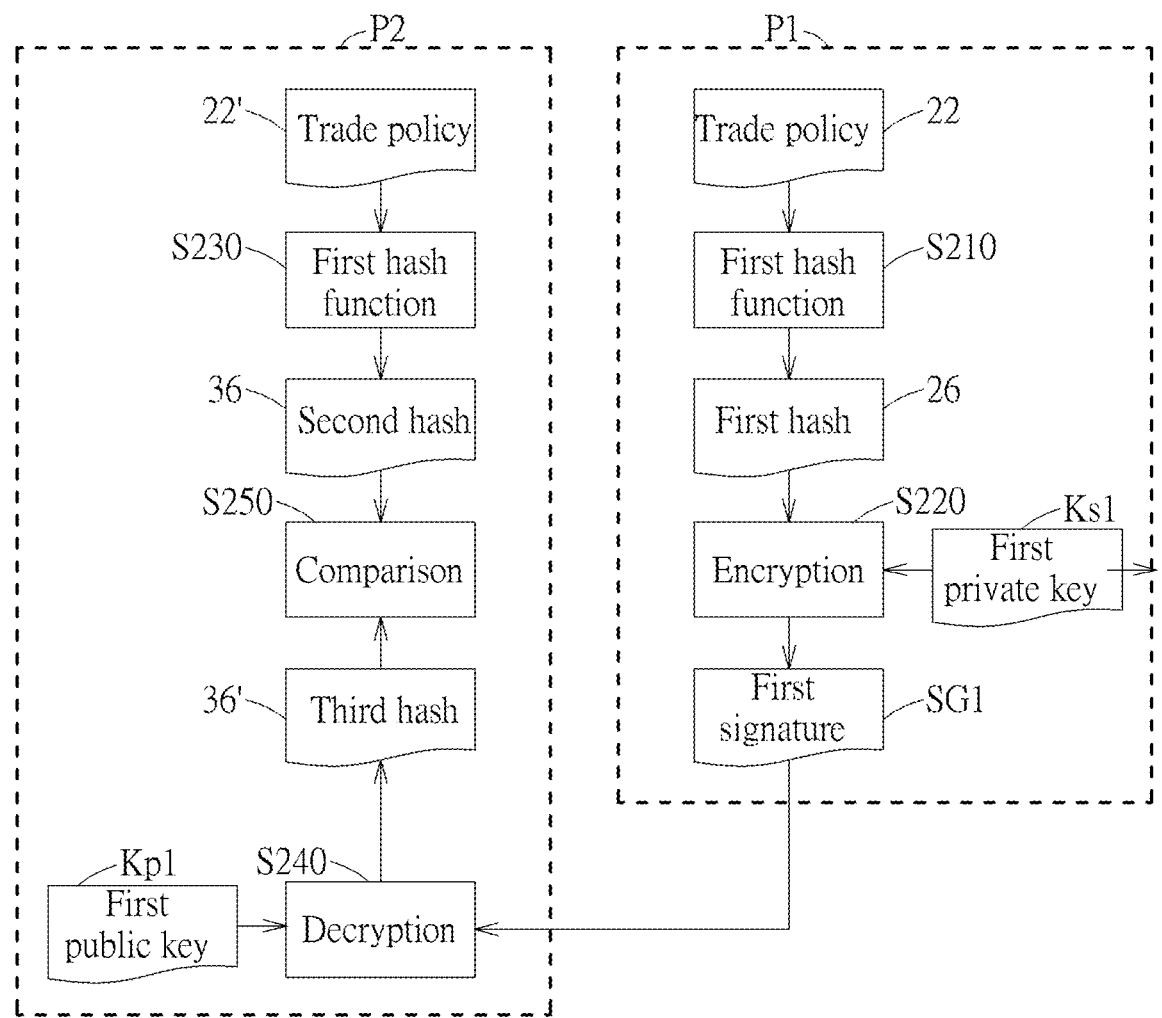
FIG. 3 is a flowchart illustrating a first client in FIG. 1 creating a first signature and a second client or a last client verifying the first signature.

FIG. 3 is a flowchart illustrating the first client 20 in FIG. 1 creating a first signature SG1 and the second client 30, the third client 40 or the approval client 50 verifying the first signature SG1. The flowchart may be divided into two parts P1 and P2. The part P1 depicts how the first client 20 generates the first signature SG1, while the part P2 shows how the second client 30, the third client 40 or the approval client 50 verifies the first signature SG1 received from the first client 20. In step S210, the first client 20 hashes the trade policy 22 with a first hash function to generate a first hash 26. In step S220, the first client 20 creates the first signature SG1 by asymmetrically encrypting the first hash 26 with the first private key Ks1 of the first public-private key pair 21. The first client 20 transmits the trade policy 22 and the first signature SG1 to the second client 30, the third client 40 and/or the approval client 50. The trade policy received by the second client 30, the third client 40 or the approval client 50 is designated as the trade policy 22'. In step S230, the second client 30, the third client 40 or the approval client 50 applies the first hash function to the received trade policy 22' to generate a second hash 36. In step S240, the second client 30, the third client 40 or the approval client 50 receives the first signature SG1 from the first client 20 and decrypts the received first signature SG1 by using the first public key Kp1 to generate a third hash 36'. In step S250, the second client 30, the third client 40 or the approval client 50 verifies the authenticity of the received trade policy 22' and the received first signature SG1 by comparing the second hash 36 with the third hash 36'. If the two hashes 36 and 36' are identical, it is confirmed that the received trade policy 22' and the received first signature SG1 have not been tampered with. Otherwise, it indicates that the received trade policy 22' and/or the received first signature SG1 have been tampered with.

Figure 4:
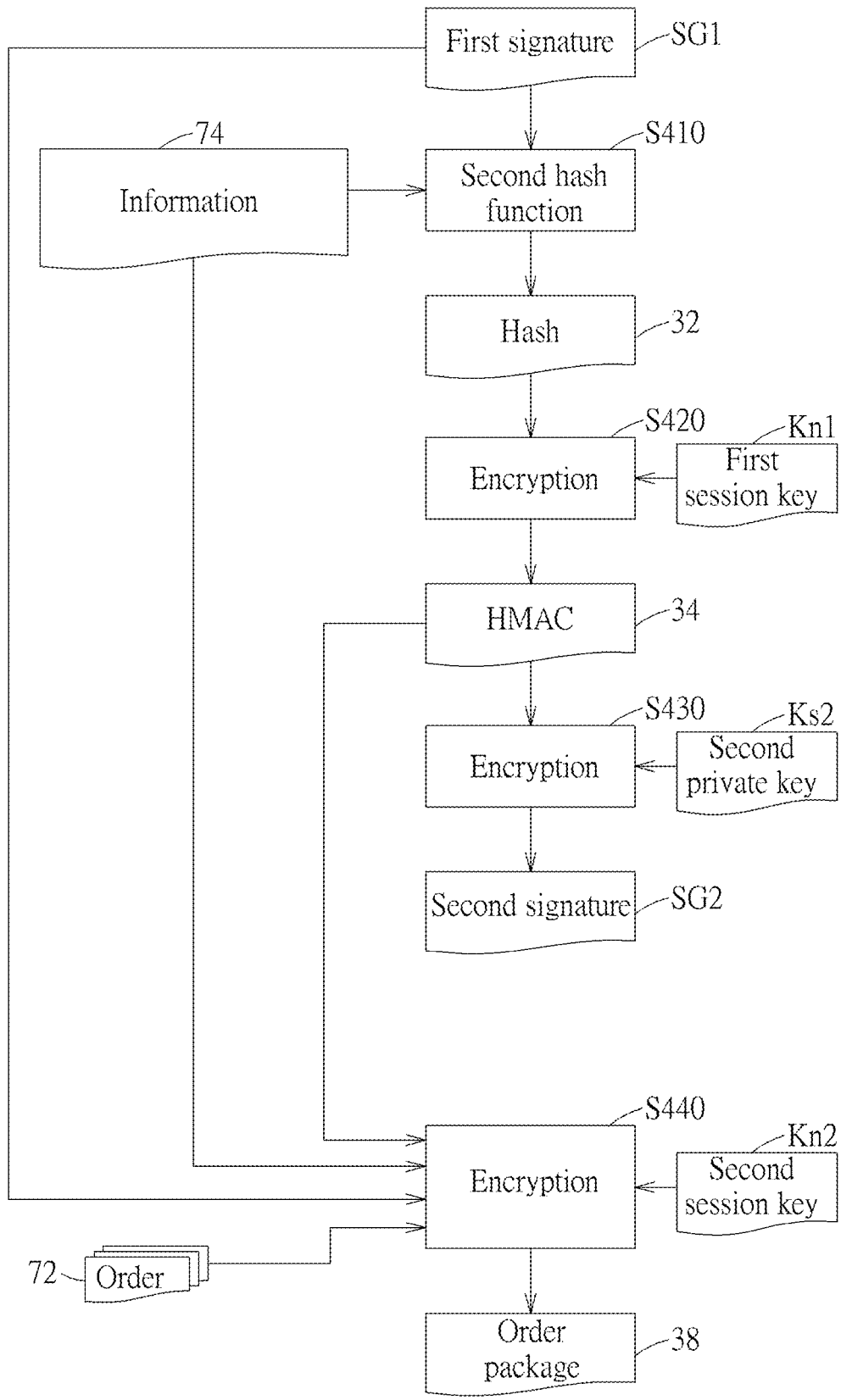
FIG. 4 is a flowchart illustrating the second client in FIG. 1 creating a second signature and an order package.

FIG. 4 is a flowchart illustrating the second client 30 in FIG. 1 creating a second signature SG2 and an order package 38. Before step S410, the second client 30 selects at least one order 72 from the order pool 70. In step S410, the second client 30 hashes the first signature SG1 and information 74 related to at least one selected order 72 with a second hash function to generate a hash content 32. The information 74 related to the selected order(s) 72 may include but not limited to an order abstract 75, a timestamp 76, a deadline 77, and a total number 78, as shown in FIG. 2. The order abstract 75 is a summary of the details of the selected order(s) 72 in the order package 38, and typically includes information such as the order numbers, customer details, items or services purchased, a sum total, and any special instructions. The order abstract 75 provides a quick reference for stakeholders to understand the core aspects of the order without having to review the entire document. The timestamp 76 records the exact date and time the order package 38 is created, processed, or modified. The timestamp 76 is used for tracking the sequence of events, auditing, and ensuring the integrity of the transaction. The timestamp 76 helps in identifying the timing of transactions, which can be important for resolving disputes, compliance, and verifying the order's timeliness. The deadline 77 indicates the latest time or date by which the order package 38 needs to be processed or fulfilled. The deadline 77 helps in prioritizing tasks, managing workflow, and ensuring that orders are completed within the required time frame. The deadline 77 is for maintaining customer satisfaction and ensuring that the payment management system operates efficiently. The total number 78 represents the number of individual selected orders 72 that are included within the order package 38.

In step S420 shown in FIG. 4, the second client 30 creates a hash-based message authentication code (HMAC) 34 by symmetrically encrypting the hash content 32 of the first signature SG1 and the information 74 related to the selected order(s) 72 using a first session key Kn1. The first session key Kn1 may be received from the HSM 80 of the payment management system 10. The HSM 80 may receive order information from the second client 30 and generate the first session key Kn1 based on the received order information. The HSM 80 then returns the first session key Kn1 to the second client 30 and simultaneously broadcasts it to all nodes (e.g., the third client 40 and the approval client 50). In an embodiment, each node (e.g., the second client 30, the third client 40 and the approval client 50) may retrieve a corresponding public-private key pair (e.g., 21, 31, 41 or 51) from the HSM based on the user's permissions. In some embodiments, step S410 can be skipped, and the second client 30 creates the HMAC 34 by symmetrically encrypting the information 74 related to the selected order(s) 72 and the first signature SG1 by using the first session Kn1 key received from the HSM 80.

In step S430 shown in FIG. 4, the second client 30 creates a second signature SG2 by asymmetrically encrypting the HMAC 34 with the second private key Ks2 of the second public-private key pair 31. In step S440 shown in FIG. 4, the second client 30 creates the order package 38 by symmetrically encrypting the selected order(s) 72, the timestamp 76, the deadline 77, the first signature SG1 and the HMAC 34 using a second session key Kn2 to wrap aforesaid content as a data packet. The second session key Kn2 may be received from the HSM 80. After creating the order package 38, the second client 30 transmits the order package 38 to the third client 40, the approval client 50 and/or a designated processing node 60 of the payment management system 10. The first session key Kn1 and the second session key Kn2 are used to ensure the clients (including the order issuer, the order reviewer and the order approver) who involved the order are kept in the same session channel. Optionally, the first session key Kn1 and the second session key Kn2 can be identical. The designated processing node 60 of the payment management system 10 can be implemented in various forms. It may be a physical electronic device, such as a computer, a mobile device or a server. Alternatively, the designated processing node 60 could be the third client 40 or the approval client 50. In some embodiments, it can be realized as a software module executing on the Saas platform 14 to execute the functions similar to the third client 40 or the approval client 50. Furthermore, the designated processing node 60 could also be constituted as a node within a distributed ledger system.

Figure 5:
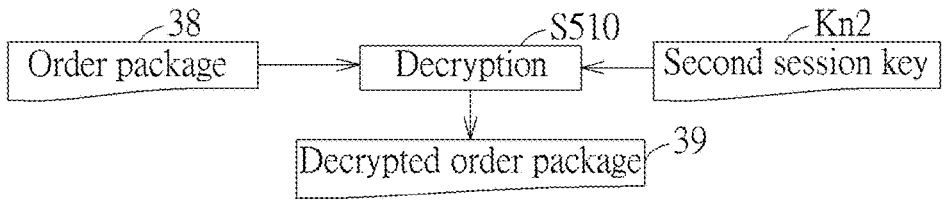
FIG. 5 is a diagram illustrating a third client in FIG. 1 decrypting the order package, verifying a hash-based message authentication code (HMAC) the second and signature, and creating a third signature.
Figure 5:
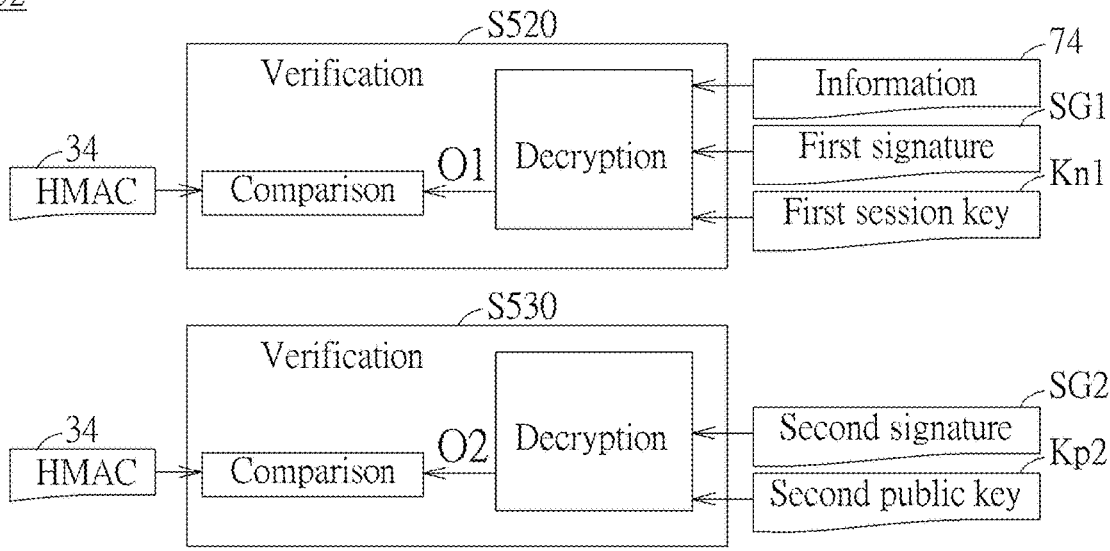
Figure 5:
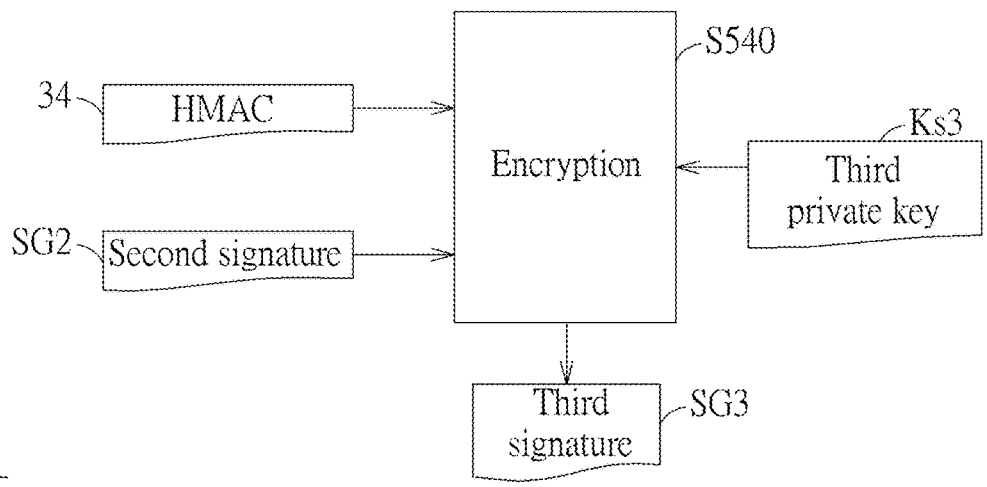

FIG. 5 is a diagram illustrating the third client 40 in FIG. 1 decrypting the order package 38, verifying the HMAC 34 and the second signature SG2, and creating a third signature SG3. The diagram is divided into three parts: P31, P32, and P33. The part P31 depicts how the third client 40 decrypts the order package 38, the part P32 depicts how the third client 40 verifies the HMAC 34 and the second signature SG2, and the part P33 depicts how the third client 40 creates the third signature SG3. In step S510, the third client 40 obtains a decrypted order package 39 by decrypting the order package 38 using the second session key Kn2 from the broadcast channel 90 for unwrapping the order package 38. The decrypted order package 39 includes the selected order 72, the information 74 related to the selected order(s) 72, the first signature SG1, and the HMAC 34. In step S520, the third client 40 verifies the HMAC 34 by using the first session key Kn1 for encrypting the information 74 related to the selected order(s) 72 (including the order abstract 75, the total number 78 of the selected order(s) 72, the timestamp 76, and the deadline 77) and the first signature SG1 to generate an encrypted result O1 and determine whether the encrypted result O1 is equal to the HMAC 34. When the encrypted result O1 is identical to the HMAC 34, the HMAC 34 passes the verification in step S520 to confirm that the HMAC 34 received by the third client 40 has not been tampered with. Otherwise, it indicates that the HMAC 34 received by the third client 40 has been tampered with, and the order package 38 received by the third client 40 would be rejected. The third client 40 can record the rejected reason in a memo and encrypt the memo with the order package 38 together by using the second session key Kn2. The rejected order package 38 may be returned to a previous client (e.g., the second client 30). The previous client may read the memo or check the signature to identify the order package is rejected by which client. In step S530, the third client 40 verifies the second signature SG2 by using the second public key Kp2 from the broadcast channel 90 to decrypt the second signature SG2 to generate a decrypted result O2. If the decrypted result O2 is identical to the HMAC 34, it confirms that the second signature SG2 received by the third client 40 has not been tampered with. Otherwise, it indicates that the second signature SG2 received by the third client 40 has been tampered with, and the order package 38 received by the third client 40 would be rejected. In another embodiment, the third client 40 may selectively perform either step S520 or step S530. In yet another embodiment, the third client 40 may perform both step S520 and step S530 for enhanced security. In step 540, the third client 40 creates the third signature SG3 by encrypting the HMAC 34 and the second signature SG2 with the third private key Ks3 of the third public-private key pair 41.

Figure 6:
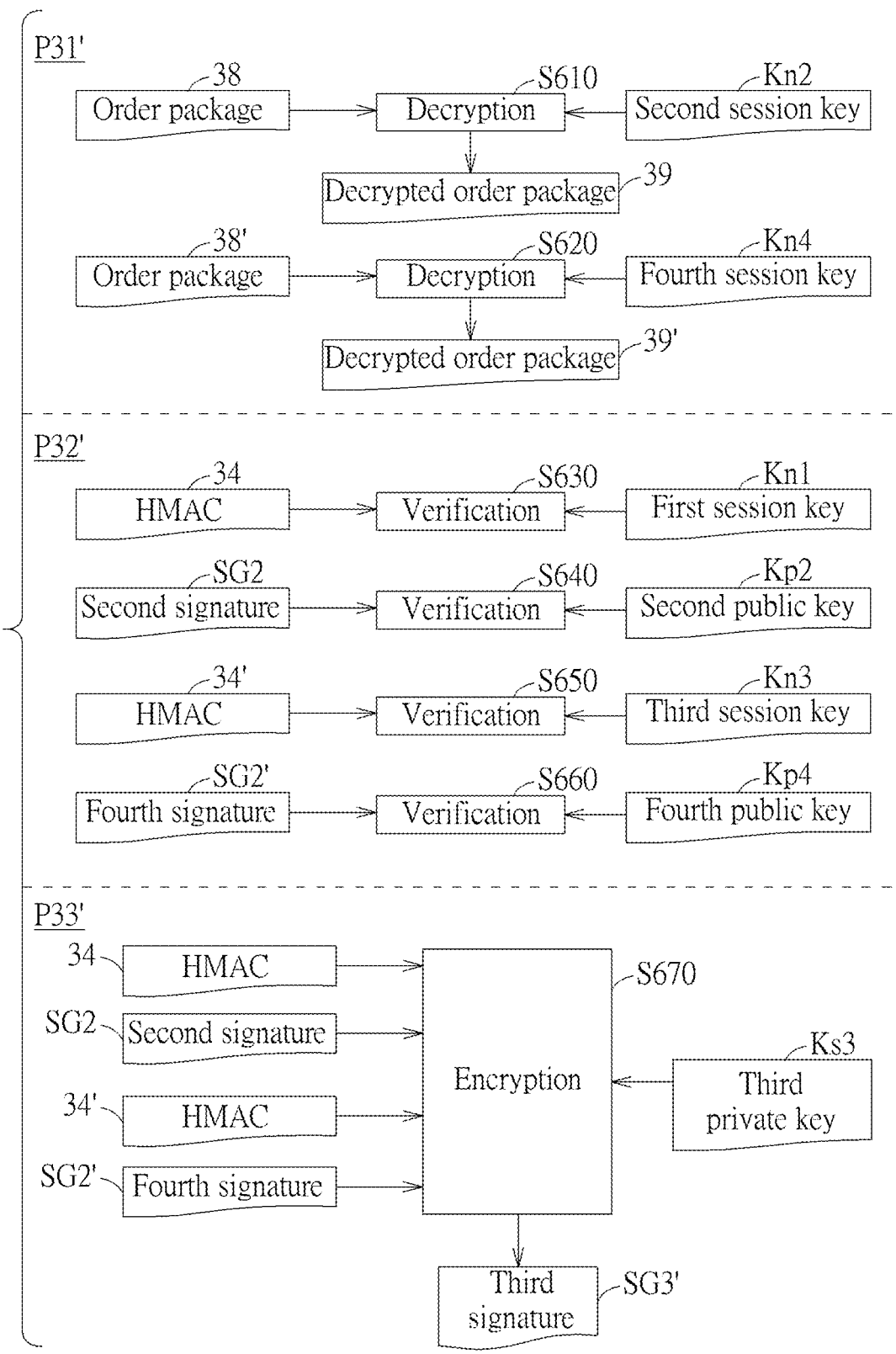
FIG. 6 is a diagram illustrating the third client in FIG. 1 decrypting order packages, verifying HMACs and second signatures, and creating a third signature according to another embodiment of the present invention.

FIG. 6 is a diagram illustrating the third client 40 in FIG. 1 decrypting the order package 38 and second package 38', verifying the HMAC 34, the second signature SG2, second HMAC 34', and a fourth signature SG2', and creating a third signature according to another embodiment. The process of wrapping the second order package 38' can also refer to the flowchart in FIG. 4. In the embodiment, the extra client 35 executes similar processes as the second client 30 does in FIG. 4. The extra client 35 selects at least one order 72' from the orders 72 stored in the order pool 70 and symmetrically encrypts information 74' related to the selected order(s) 72' and the first signature SG1 by using a third session key Kn3 to create a second HMAC 34'. The information 74' related to the selected order(s) 72' may include but not limited to an order abstract 75', a timestamp 76', a deadline 77', and a total number 78', as shown in FIG. 2. After the second HMAC 34' is created, the extra client 35 asymmetrically encrypts the second HMAC 34' with the fourth private key Ks4 of the fourth public-private key pair 37 to create a fourth signature SG2' and then wraps the information 74' related to the selected order(s) 72', the fourth signature SG2', and the second HMAC 34' with a fourth session key Kn4 to create a second order package 38'. The fourth public key Kp4 of the fourth public-private key pair 37, the third session key Kn3, and the fourth session key Kn4 are broadcasted to the broadcast channel 90. The third client 40 would combine the order package 38 and the order package 38'. In some embodiments, the third session key Kn3 and the fourth session key Kn4 may provide by the HSM 80.

The diagram illustrated in FIG. 6 is divided into three parts: P31', P32', and P33'. The part P31' depicts how the third client 40 decrypts the order packages 38 and the second order package 38'. The part P32' depicts how the third client 40 verifies the HMAC 34, the second signature SG2, the second HMAC 34', and the fourth signature SG2'. The part P33' depicts how the third client 40 creates the third signature SG3'. In step S610, the third client 40 unwraps the order package 38 to obtain the decrypted order package 39 by decrypting the order package 38 using the second session key Kn2. In step S620, the third client 40 unwraps the order package 38' to obtain a second decrypted order package 39' by decrypting the second order package 38' using the fourth session key Kn4. The second decrypted order package 39' includes at least one selected order 72', the information 74' related to the selected order(s) 72', the first signature SG1, and the second HMAC 34', extracted from the order package 38. In step S630, the third client 40 verifies the HMAC 34 by using the first session key Kn1 as in step S520. In step S640, the third client 40 verifies the second signature SG2 by using the second public key Kp2 as in step S530. In step S650, the third client 40 verifies the second HMAC 34' using the third session key Kn3. In step S660, the third client 40 verifies the fourth signature SG2' using the fourth public key Kp4. In step 670, the third client 40 creates the third signature SG3' by encrypting the HMAC 34, the second signature SG2, the second HMAC 34', and the fourth signature SG2' with the third private key Ks3. After combining the order packages 38 and the second order package 38', the third client 40 may transmit a combined package and the third signature SG3' to the approval client 50, so that the approval client 50 may verify the selected orders 72 and 72' by using the third signature SG3'.

Each order package 38 may include one or more selected orders 72, and similarly, each order package 38' may include one or more selected orders 72'. Consequently, the notation "order(s) 72" and "order(s) 72'" is used throughout this specification to accommodate both singular and plural instances, referring to either a single order or multiple orders contained within the respective packages 38 and 38'.

Figure 7:
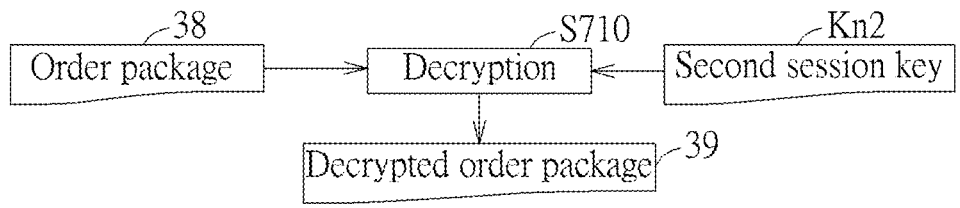
FIG. 7 is a diagram illustrating the last client in FIG. 1 decrypting the order package, verifying the HMAC, the first signature, the second signature and the third signature, and creating a fourth signature.
Figure 7:
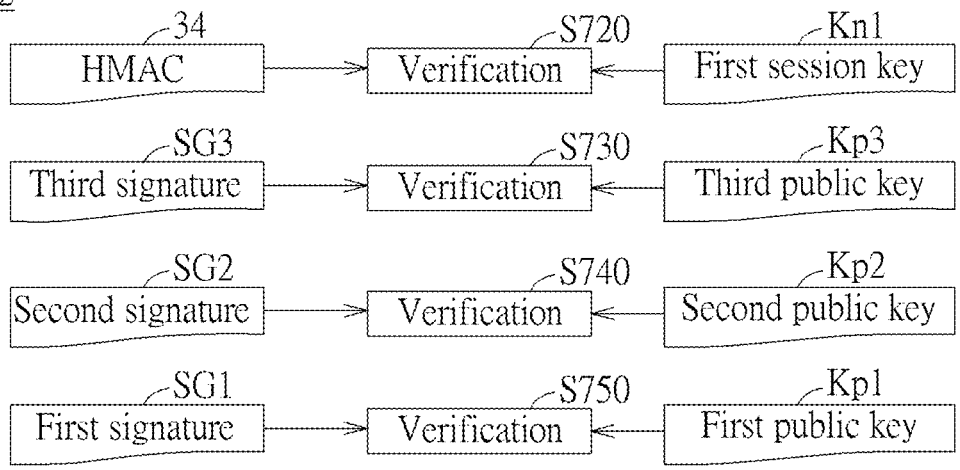
Figure 7:
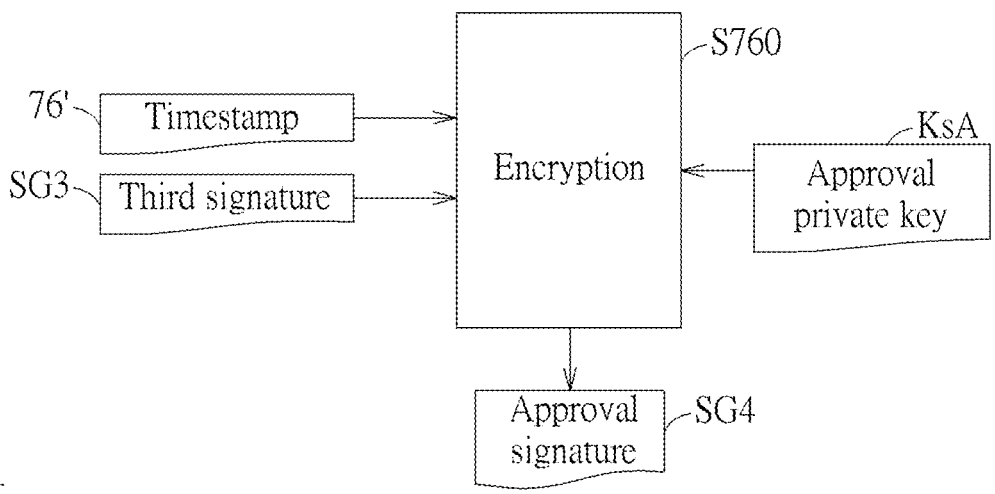

FIG. 7 is a diagram illustrating the approval client 50 in FIG. 1 decrypting the order package 38, verifying the HMAC 34, the first signature SG1, the second signature SG2 and the third signature SG3, and creating an approval signature SG4. The diagram is divided into three parts: P41, P42, and P43. The part P41 depicts how the approval client 50 decrypts the order package 38. The part P42 depicts how the approval client 50 verifies the HMAC 34, the first signature SG1, the second signature SG2 and the third signature SG3. The part P43 depicts how the approval client 50 creates the approval signature SG4. In step S710, the approval client 50 obtains the decrypted order package 39 by decrypting the order package 38 using the second session key Kn2. In step S720, the approval client 50 verifies the HMAC 34 using the first session key Kn1 from the broadcast channel 90. In step S730, the approval client 50 verifies the third signature SG3 using the third public key Kp3 from the broadcast channel 90. In step S740, the approval client 50 verifies the second signature SG2 using the second public key Kp2 from the broadcast channel 90. In step S750, the approval client 50 verifies the first signature SG1 using the first public key Kp1 from the broadcast channel 90. The verification details related to HMAC and signatures are similar to steps S520 and S530. If any verification in steps S720 to S750 fails, the order package 38 received by the approval client 50 would be rejected. If all verifications in steps S720 to S750 pass, it confirms that the trade policy 22 and the order package 38 received by the approval client 50 has not been tampered with. After the trade policy 22 is confirmed to have not been tampered with, the approval client 50 may determine whether the order(s) 72 of the order package 38 comply with the trade policy 22 and compares the deadline 77 with the current time. If any order 72 of the order package 38 does not comply with the trade policy 22 or the current time has exceeded the deadline 77, the order package 38 received by the approval client 50 will be rejected. Otherwise, in step S760, the approval client 50 generates the approval signature SG4 and transmits the order(s) 72 of the order package 38 to a transaction router 100 (shown in FIG. 1) of the payment management system 10. After determining that the order(s) 72 comply with the trade policy 22, the approval client 50 creates the approval signature SG4 by encrypting a timestamp 76' and/or the third signature SG3 with the approval private key KsA of the approval public-private key pair 51. The timestamp 76' records the exact date and time the approval signature SG4 is created.

In an embodiment, the trade policy 22 sets a transaction amount threshold, such as $5,000. When a sum total of the order(s) 72 does not exceed the transaction amount threshold, it qualifies for fast payment conditions. Under these conditions, the order(s) 72 is/are directly processed by the approval client 50, bypassing the third client 40. This streamlined processing route ensures quicker transaction handling and enhances the efficiency of the payment management system. In this embodiment, the approval client 50 creates the approval signature SG4 by encrypting the timestamp 76' and/or the first signature SG1 with the approval private key KsA.

In an embodiment, the trade policy 22 may establish a high-value transaction threshold, such as $100,000. When the sum total of the order(s) 72 exceeds this threshold, the payment management system 10 implements a multi-level approval process to enhance security and ensure accuracy. This process mandates sequential approval by the second client 30 (order aggregator), the third client 40 (verifier), and lastly the approval client 50 (financial approver). This multi-tiered review system provides a robust control mechanism for high-value transactions. Each client within this sequence conducts thorough checks and validations, ensuring that all aspects of the transaction are scrutinized and approved before the payment is processed.

In another embodiment, the trade policy 22 sets a specific supplier. When the order(s) 72 is/are initiated by the specific supplier, it qualifies for fast payment conditions. Under these conditions, the order(s) 72 is/are directly processed by the approval client 50, bypassing the third client 40. This streamlined processing route ensures quicker transaction handling and enhances the efficiency of the payment management system. In this embodiment, the approval client 50 creates the approval signature SG4 by encrypting the timestamp 76' and/or the first signature SG1 with the approval private key KsA.

Figure 8:
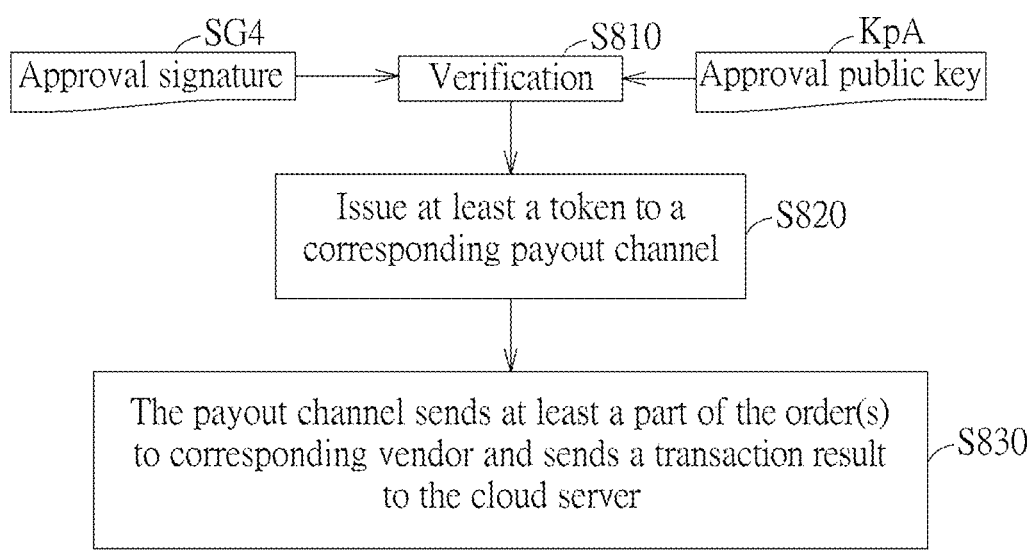
FIG. 8 is a flowchart illustrating a transaction router in FIG. 1 verifying the fourth signature and a corresponding payout channel sending at least a part of the orders to at least one corresponding vendor.

FIG. 8 is a flowchart illustrating the transaction router 100 in FIG. 1 verifying the approval signature SG4 and a corresponding payout channel 110 sending at least a part of the orders 72 to at least one corresponding vendor 120. In step S810, the transaction router 100 begins by verifying the approval signature SG4 using the approval public key KpA. If the verification fails, the transaction is rejected. However, if the verification is successful, the transaction router 100 analyzes the transaction data, considering factors such as transaction amount, currency, payment method, and risk level. Based on this analysis, the transaction router 100 determines the most suitable payout channel 110 for each order. This may involve routing transactions to different payment gateways (e.g., automated clearing house payment, SWIFT, credit card network, decentralized payment network), acquiring banks, or other relevant channels. In step S820, the transaction router 100 then issues at least a token to a corresponding payout channel 110 after verifying the approval signature SG4. If there are different payout methods (e.g., credit card processors, digital wallets) used within a single order package 38, the transaction router 100 issues a plurality of tokens to corresponding payout channels 110 after verifying the approval signature SG4. In step S830, upon receiving the token from the transaction router 100, the payout channel 110 sends corresponding order(s) 72 of the order package 38 to at least one corresponding vendor 120 and sends a transaction result to the cloud server 12.

In one embodiment, the first client 20 has the capability to update the trade policy 22 by utilizing advanced artificial intelligence (AI) or machine learning (ML) algorithms. These cutting-edge technologies enable the payment management system 10 to analyze historical orders 72 and transaction frequency, extracting valuable insights and identifying significant patterns and trends. By continuously learning from past transactions, the AI or ML algorithms can make informed predictions and adjustments to the trade policy 22 or give a fast-pass tag attached to an order which matches with the trade policy. This dynamic and data-driven approach ensures that the trade policy remains adaptive and responsive to changing market conditions and evolving transaction behaviors. Consequently, the payment management system 10 becomes more efficient, accurate, and capable of making strategic decisions that enhance overall performance.

Since the payment management system 10 leverages asymmetric cryptography for data security, the integrity and confidentiality of information are maintained even when the first client 20, the second client 30, the third client 40, and the approval client 50 operate on distinct servers within the system. This architecture distributed enhances system scalability and flexibility while ensuring secure communication and data exchange among the different components. The use of public-key cryptography allows for secure data transmission between these distributed components, minimizing the risk of data breaches and unauthorized access.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A payment management system, comprising:
   a hardware security module (HSM) configured to provide a first session key and a second session key;
   a first client, configured to:
   provide a trade policy;
   hash the trade policy with a first hash function to generate a first hash;
   asymmetrically encrypt, by a first private key of a first public-private key pair, the first hash to generate a first signature; and
   broadcast a first public key of the first public-private key pair;
   a second client, configured to:
   select at least one first order from an order pool that has a plurality of orders;
   symmetrically encrypt information related to the at least one first order and the first signature by using the first session key from the HSM to create a first hash-based message authentication code (HMAC), wherein the information related to the at least one first order includes a summary of the at least one first order, a timestamp, an expired time, and the first signature;
   asymmetrically encrypt the first HMAC with a second private key of a second public-private key pair to create a second signature;
   wrap the information related to the at least one first order, the first signature, and the first HMAC by using the second session key from the HSM to create a first order package;
   deliver the first order package, the first HMAC and the second signature to a designated processing node; and
   broadcast a second public key of the second public-private key pair, the first session key, and the second session key;

an approval client, configured to:
  unwrap the first order package to extract the information related to the at least one first order, the first signature, and the first HMAC by using the second session key;
  confirm that the trade policy has not been tampered with by verifying the first signature using the first public key;
  determine whether the at least one first order complies with the trade policy;
  verify all prior signatures by using corresponding public keys, respectively;
  asymmetrically encrypt a signature received from an immediately preceding client with an approval private key of an approval public-private key pair to generate an approval signature; and
  broadcast an approval public key of the approval public-private key pair; and
a transaction router, configured to:
  verify the approval signature by using the approval public key for executing a transaction,
wherein the HSM, the first client, the second client, the approval client and the transaction router are being implemented by one or more processors.

2. The payment management system of claim 1, wherein the second client is configured to hash the information related to the at least one first order and the first signature to generate a hashed content, and symmetrically encrypt the hashed content by using the first session key to create the first HMAC; wherein the information related to the at least one first order includes a summary of the at least one first order, a timestamp, an expired time, and the first signature.

3. The payment management system of claim 1, further comprising:
a third client, being implemented by the one or more processors, configured to:
  unwrap the first order package from the second client to extract the information related to at least one first order, the first signature, and the first HMAC by using the second session key;
  asymmetrically encrypt the second signature and first HMAC with a third private key of a third public-private key pair to create a third signature;
  deliver the first order package, the first HMAC, the second signature, and the third signature to the designated processing node; and
  broadcast a third public key of the third public-private key pair.

4. The payment management system of claim 3, wherein the third client is further configured to verify the first HMAC using the first session key for determining the first order package having not been tampered with.

5. The payment management system of claim 3, wherein the third client is further configured to verify the second signature using the second public key to confirm that the second signature is signed by the second client.

6. The payment management system of claim 3, wherein the HSM is further configured to:
  associate the first public-private key pair with a first client identity (ID) token from the first client;
  associate the second public-private key pair with a second client identity (ID) token from the second client;
  associate the third public-private key pair with a third client identity (ID) token from the third client; and
  associate the approval public-private key pair with an approval client identity (ID) token from the approval client.

7. The payment management system of claim 3, wherein the trade policy sets a first transaction amount threshold; and
  wherein when a sum total of the at least one first order exceeds the first transaction amount threshold, the at least one first order is sequentially processed by the second client, the third client and the approval client.

8. The payment management system of claim 3, wherein the immediately preceding client is the third client, and the approval client is further configured to:
  verify the first HMAC by using the first session key for determining the first order package having not been tampered with;
  wherein the approval client verifies the second signature by using the second public key for determining the first HMAC having not been tampered;
  wherein the approval client verifies the third signature by using the third public key; and
  wherein the approval client asymmetrically encrypts the third signature from the third client with the approval private key of the approval public-private key pair to generate the approval signature.

9. The payment management system of claim 8, wherein the transaction router is further configured to:
  issue at least a token to a corresponding payout channel of a plurality of payout channels to execute at least one transaction after verifying the approval signature;
  wherein the corresponding payout channel sends at least a part of the at least one first order to at least one corresponding vendor and sends a transaction result to a readable storage medium of the payment management system.

10. The payment management system of claim 3, wherein:
  the immediately preceding client is the third client,
  the approval client verifies the second signature by using the second public key for determining the first HMAC having not been tampered,
  the approval client verifies the first HMAC by using the first session key for determining the first order package having not been tampered with, and
  the approval client asymmetrically encrypts the third signature from the third client with the approval private key of the approval public-private key pair to generate the approval signature.

11. The payment management system of claim 10, wherein the transaction router is further configured to:
  issue at least a token to a corresponding payout channel of a plurality of payout channels to execute at least one transaction after verifying the approval signature;
  wherein the corresponding payout channel sends at least a part of the at least one first order to at least one corresponding vendor and sends a transaction result to a readable storage medium of the payment management system.

12. The payment management system of claim 1, further comprising:
an extra client, being implemented by the one or more processors, configured to:
  select at least one second order from the order pool;
  symmetrically encrypt information related to the at least one second order and the first signature by using a third session key from the HSM to create a second HMAC;
  asymmetrically encrypt the second HMAC with a fourth private key of a fourth public-private key pair to create a fourth signature;

wrap the information related to at least one second order, the fourth signature, and the second HMAC with a fourth session key to create a second order package;

deliver the second order package, the second HMAC and the fourth signature to the designated processing node; and broadcast a fourth public key of the fourth public-private key pair, the third session key, and the fourth session key; and a third client, being implemented by the one or more processors, configured to:

unwrap the first order package received from the second client to extract the information related to the at least one first order, the first signature, and the first HMAC by using the second session key;

unwrap the second order package received from the extra client to extract the information related to the at least one second order, the fourth signature, and the second HMAC by using the fourth session key;

asymmetrically encrypt the first signature, the fourth signature, the first HMAC, and the second HMAC with a third private key of a third public-private key pair to create a third signature;

deliver the first order package, the second order package, the first HMAC, the second HMAC, and the third signature to the designated processing node; and broadcast a third public key of the third public-private key pair.

13. The payment management system of claim 1, wherein the order pool is a database to store the plurality of orders which have been created; and wherein each order comprises a sender, a receiver, a sum, and a payout channel.

14. The payment management system of claim 1, wherein the trade policy sets a transaction amount threshold; and wherein when a sum total of the at least one first order does not exceed the transaction amount threshold, the at least one first order is processed by the second client and the approval client only.

15. The payment management system of claim 1, wherein the trade policy sets a specific supplier; and wherein when the at least one first order is initiated by the specific supplier, the at least one first order is processed by the second client and the approval client.

16. The payment management system of claim 1, wherein the second client selects multiple orders from the order pool, the first HMAC is symmetrically encrypted with the information, which is abstracted from the multiple orders and a sum total of the multiple orders, and the first signature by using the first session key.

17. The payment management system of claim 1, wherein the first client is further configured to update the trade policy using a machine learning (ML) algorithm to give a fast-pass tag attached to the at least one first order by analyzing historical orders and a transaction frequency.

18. A payment management system, comprising:

a physical device, being implemented by a hardware comprising hardware security module (HSM), configured to provide a first session key and a second session key;

a Software as a Service (SaaS) platform comprising a readable storage medium to store computer program instructions and one or more processors to execute the computer program instructions to perform functions of:

a first client that is configured to:
provide a trade policy;
hash the trade policy with a first hash function to generate a first hash;
asymmetrically encrypt, by a first private key of a first public-private key pair, the first hash to generate a first signature; and
broadcast a first public key of the first public-private key pair;

a second client that is configured to:
select at least one first order from an order pool that has a plurality of orders;
symmetrically encrypt information related to the at least one first order and the first signature by using the first session key to create a first hash-based message authentication code (HMAC), wherein the information related to the at least one first order includes a summary of the at least one first order, a timestamp, an expired time, and the first signature;
asymmetrically encrypt the first HMAC with a second private key of a second public-private key pair to create a second signature;
wrap the information related to the at least one first order, the first signature, and the first HMAC by using the second session key to create a first order package;
deliver the first order package, the first HMAC and the second signature to a designated processing node; and
broadcast a second public key of the second public-private key pair, the first session key, and the second session key;

an approval client that is configured to:
unwrap the first order package to extract the information related to the at least one first order, the first signature, and the first HMAC by using the second session key;
confirm that the trade policy has not been tampered with by verifying the first signature using the first public key;
determine whether the at least one first order complies with the trade policy;
verify all prior signatures by using corresponding public keys, respectively;
asymmetrically encrypt a signature received from a third client with an approval private key of an approval public-private key pair to generate an approval signature; and
broadcast an approval public key of the approval public-private key pair; and a transaction router, being implemented by a processor, configured to:
verify the approval signature by using the approval public key for executing a transaction.

19. The payment management system of claim 18, wherein the one or more processors execute the computer program instructions to perform functions of:

an extra client that is configured to:
select at least one second order from the order pool;
symmetrically encrypt information related to the at least one second order and the first signature by using a third session key to create a second HMAC, wherein the third session key is provided by the physical device;
asymmetrically encrypt the second HMAC with a fourth private key of a fourth public-private key pair to create a fourth signature;

wrap the information related to at least one second order, the fourth signature, and the second HMAC with a fourth session key to create a second order package;

deliver the second order package, the second HMAC and the fourth signature to the designated processing node; and broadcast a fourth public key of the fourth public-private key pair, the third session key, and the fourth session key; and the third client that is configured to:

unwrap the first order package received from the second client to extract the information related to the at least one first order, the first signature, and the first HMAC by using the second session key;

unwrap the second order package received from the extra client to extract the information related to the at least one second order, the fourth signature, and the second HMAC by using the fourth session key;

asymmetrically encrypt the first signature, the fourth signature, the first HMAC, and the second HMAC with a third private key of a third public-private key pair to create a third signature;

deliver the first order package, the second order package, the first HMAC, the second HMAC, and the third signature to the designated processing node; and broadcast a third public key of the third public-private key pair.

20. The payment management system of claim 18, wherein the first client is further configured to update the trade policy using a machine learning (ML) algorithm to give a fast-pass tag attached to the at least one first order by analyzing historical orders and a transaction frequency.

* * * * *